United States Patent Office 3,415,824
Patented Dec. 10, 1968

3,415,824
ARYL-1,3,5-TRIAZINE DERIVATIVES
Hans Rudolf Biland, Basel, Christian Luethi, Munchenstein, and Max Duennenberger, Frenkendorf, Switzerland, assignors to Ciba Limited, Basel, Switzerland, a company of Switzerland
No Drawing. Filed Apr. 18, 1966, Ser. No. 543,058
Claims priority, application Switzerland, Apr. 20, 1965, 5,439/65
10 Claims. (Cl. 260—248)

ABSTRACT OF THE DISCLOSURE

New aryl-triazines are provided which may be represented by the formula

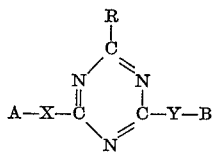

where R represents an unsubstituted or substituted six-membered aromatic cyclic system containing a hydroxyl group in ortho-position to the bond with the triazine ring, which may be fused with a further five-membered or six-membered aromatic ring system and is bound through a carbon atom with the triazine ring; X and Y are different divalent hetero atom groupings such as —O—, —S— or —NQ— (in which Q represents a hydrogen atom or a lower aliphatic residue bound with nitrogen through a carbon atom), and A and B each represents one of the following groups containing up to 20 carbon atoms: alkyl, alkenyl, cycloalkyl, aralkyl, phenyl or naphthyl, which groups may be substituted.

The compounds of the present invention are especially useful as antioxidants for high molecular weight organic materials which are subject to oxidative degradation.

---

The present invention provides new, valuable aryl-1,3,5-triazine derivatives containing the structural element (1)

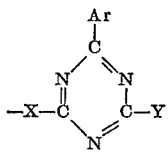

where X and Y are different divalent hetero atom groupings such as —O—, —S— or —NQ— (in which Q represents a hydrogen atom or a lower aliphatical radical) and Ar represents an aromatic cyclic system containing a hydroxyl group in ortho-position to the bond with the triazine ring.

Thus, the aryl-1,3,5-triazine derivatives of the present invention correspond quite generally, to the formula (2)

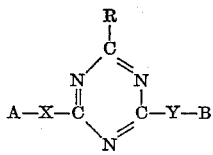

where R represents an unsubstituted or substituted six-membered aromatic cyclic system containing a hydroxyl group in ortho-position to the bond with the triazine ring, which may be fused with a further five-membered or six-membered aromatic ring system and is bound through a carbon atom with the triazine ring; X and Y are different divalent hetero atom groupings such as —O—, —S— or —NQ— (in which Q represents a hydrogen atom or a lower aliphatic residue bound with nitrogen through a carbon atom), and A and B each represents one of the following groups containing up to 20 carbon atoms: alkyl, alkenyl, cycloalkyl, aralkyl, phenyl or naphthyl, which groups may be substituted.

Of special practical value are those aryl-1,3,5-triazines of the Formula 2 which correspond to the formula (3)

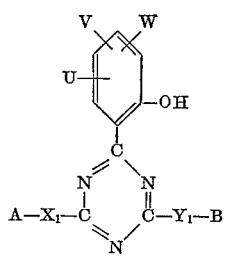

where A and B have the above meanings; $X_1$ and $Y_1$ are different and each represents an oxygen or sulphur atom or an imino group; U and V may be identical or different and each represents a hydrogen atom, a halogen atom or an alkyl group, and W stands for a hydrogen atom, a halogen atom, an alkyl or phenyl group or for the group —O—$R_1$ in which $R_1$ represents a hydrogen atom, an alkenyl group, especially one containing up to 9 carbon atoms, a possibly substituted alkyl group, an aralkyl group or a residue of the formula $$—CO(NH)_{m-1}D_1$$

(where $n=1$ or 2 and D represents an alkyl or cycloalkyl group or a possibly substituted phenyl group). Of special importance among the alkyl groups U and V of the above definition are those containing 1 to 6 carbon atoms and as halogens chlorine or bromine.

Particular attention is directed to the compounds corresponding to the general formula (4)

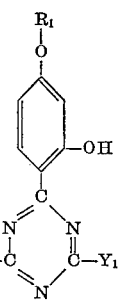

where $R_1$ has the same meaning as in Formula 3; $X_1$ and $Y_1$ are different divalent hetero atom groups such as —O—, —S— or —NH—, and $A_1$ and $B_1$ each represents an alkyl group containing up to 20 carbon atoms, or a phenyl group which may be substituted by one or several alkyl or alkoxy groups containing up to 6 carbon atoms or by halogen atoms. The substituent —O—$R_1$ is in most cases a hydroxyl group, an alkoxy group containing up to 18 carbon atoms, an allyloxy or benzyloxy group.

Of special value, because of their very good stability, are those compounds of the invention which correspond to the general formula

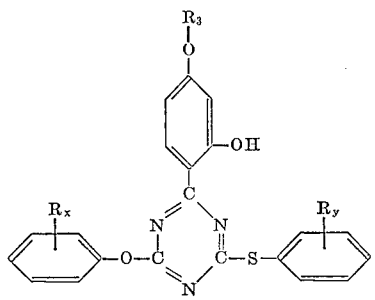

where $R_3$ represents a hydrogen atom, an alkyl group containing up to 8 carbon atoms, an allyl group, a benzyl group, a carbalkoxyalkyl group containing up to 4 carbon atoms, an aliphatic acyl group cotnaining up to 18 carbon atoms or a benzoyl group; $R_x$ stands for a hydrogen atom, a hydroxyl group, an alkyl group containing up to 6 carbon atoms or a halogen atom, and $R_y$ represents a hydrogen atom, an alkyl group containing up to 4 carbon atoms, or a halogen atom.

Of specific value among these compounds is the group of compounds represented by the formula (6)

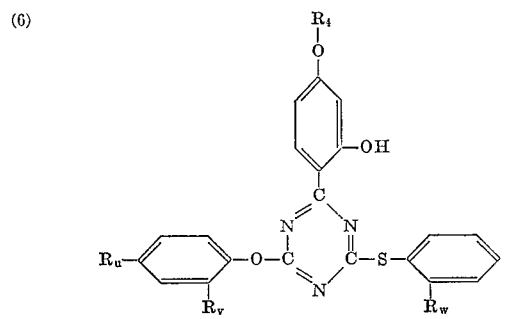

where $R_4$ represents a hydrogen atom, an ethyl group, a benzoyl group or a group $—CO—C_nH_{2n+1}$ (where $n=1$ to 17); $R_u$ stands for a hydrogen or chlorine atom; $R_v$ for a hydrogen atom or a methyl group, and $R_w$ for a hydrogen atom or a methyl group.

Further variants of compounds of the Formula 4 belong, for example, to the following types:

Compounds of the formula (4a)

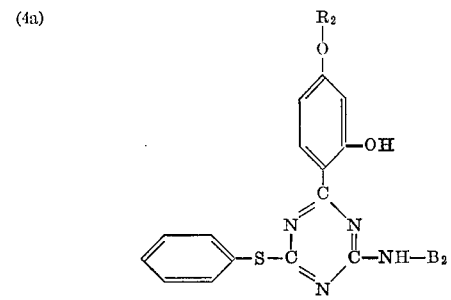

where $R_2$ stands for a hydrogen atom, an alkyl group containing up to 18 carbon atoms, an allyl group, a benzyl group, a carbalkoxyalkyl group containing up to 8 carbon atoms, a group —CO—NH—alkyl whose alkyl residue contains up to 8 carbon atoms, a group —Co—NH—phenyl, —CO—aryl or —CO—alkyl, and $B_2$ stands for an alkyl group containing up to 18 carbon atoms, or a phenyl group;

compounds of the formula (4b)

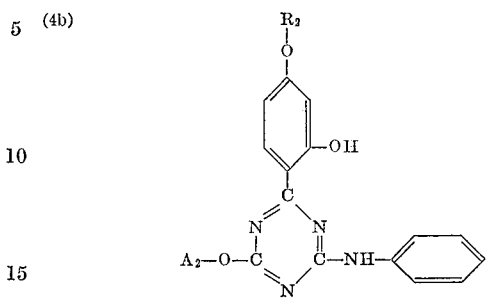

where $R_2$ has the same meaning as in Formula 4a, and $A_2$ represents an alkyl group containing up to 18 carbon atoms, a phenyl group, or a phenyl group substituted by halogen atoms or by alkyl groups containing up to 10 carbon atoms;

compounds of the formula (5a)

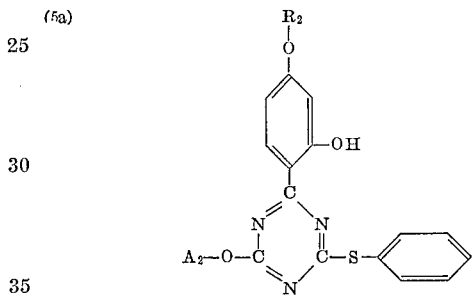

where $R_2$ and $A_2$ have the same meanings as in Formula 4b.

As possible substituents for the types of compounds defined above there may be mentioned, for example, triazine derivatives in which R according to the Formula 2 represents a residue of the formula (7a)

where $R_2$ stands for a hydrogen atom or for an alkyl group containing up to 18 carbon atoms which may be substituted by a chlorine atom, a hydroxyl, cyano, carboxyl, carbalkoxy or carbamyl group, such as ethyl, dodecyl, octadecyl, $—CH_2—CH_2—CH_2—Cl$, $—CH_2—CH_2—OH$,
$—CH_2—CH_2—CH_2—CH_2—OH$,
$—CH_2—CH_2—CH_2—CN$, $—CH_2—COOH$,
$—CH_2—(CH_2)_9—COOH$, $—CH_2—COOCH_3$,
$—CH_2—CH_2—CH_2—COOC_2H_5$, $—CH_2—CONH_2$ or
$—CH_2—(CH_2)_9—CONH_2$ an aralkyl or alkenyl group containing up to 9 carbon atoms, such as benzyl, para-chlorobenzyl, para-methylbenzyl, para-methoxybenzyl, phenylpropyl, $—CH_2—CO—C_6H_5$, allyl or crotyl, or a residue of the formula (7b)

(where $n=1$ or 2 and D represents an alkyl group containing up to 18 carbon atoms, such as ethyl, octyl or octadecyl, or a phenyl group which may be substituted by a chlorine atom, a phenyl or hydroxyl group or by an alkyl or alkoxy group containing up to 8 carbon atoms, such as phenyl, para-chlorophenyl, para-phenylphenyl, ortho-hydroxyphenyl, para-methylphenyl, para-octylphenyl, para-tertiary butoxyphenyl and para-methoxyphenyl).

Preferably, the residue D is an alkyl group containing no more than 12 carbon atoms or a phenyl group which may be substituted by a chlorine atom or by a hydroxyl group.

Of special value is a residue R of the formula (7c) 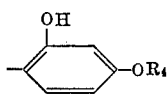

where $R_4$ represents a hydrogen atom, an alkyl group containing up to 12 carbon atoms, a hydroxyalkyl, cyanoalkyl, carboxyalkyl, carbalkoxyalkyl or an alkenyl group containing up to 4 carbon atoms, or a benzyl group which may be substituted by a chlorine atom.

Examples of preferred residues R are the 2′,4′-dihydroxyphenyl, 2′ - hydroxy - 4′ - alkoxyphenyl, 2′ - hydroxyphenyl, 2′ - hydroxy - 4′ - acyloxyphenyl and the 2′-hydroxynaphthyl group.

Preferred residues A and B in the Formula 2 are above all, for example, alkyl groups containing up to 18 carbon atoms such as methyl, octyl or octadecyl, alkenyl groups containing advantageously up to 4 carbon atoms, for example allyl groups, phenylalkyl or alkoxyalkyl groups containing up to 12 carbon atoms such as benzyl, parachlorobenzyl, phenylpropyl, —CH₃—O—CH₂—CH₂— or

—CH₃—CH₂—CH₂—CH₂—O—CH₂—CH₂— or benzene residues of the formula (7d) 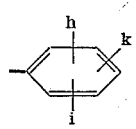

where $h$ and $k$ are identical or different and each stands for a hydrogen atom, a halogen atom, a carboxyl group or an alkyl group containing up to 12 carbon atoms; $i$ stands for a hydrogen or halogen atom, an alkyl or phenylalkyl group containing up to 12 carbon atoms, a hydroxyl, carboxyl, carbamyl, nitro, amino, phenyl or cyclohexyl group, or an alkylamino, carbalkoxy, alkoxy or alkenyl group containing up to 8 carbon atoms. As examples of such benzene residues there may be mentioned:

phenyl,
4-hydroxy-3,5-di-tertiary butylphenyl,
2-methylphenyl,
4-nonylphenyl,
2-methyl-5-isopropylphenyl,
2,4-di-tertiary butylphenyl,
2-methoxyphenyl,
2-tertiary butyl-4-methoxyphenyl,
2-methoxy-4-propylphenyl,
2,4,6-tricarboxyphenyl,
4-carbethoxyphenyl,
3-diethylaminophenyl,
2-carbaminophenyl,
2,4,5-trichlorophenyl,
2,4,6-tribromophenyl,
4-chloro-3,5-dimethylphenyl,
3-nitrophenyl,
3-aminophenyl,
4-cyclohexylphenyl,
4-phenylphenyl and
cumyl.

Of special interest are compounds of the Formula 2 in which A or B represents a hydrogen atom, an alkyl group containing up to 12 carbon atoms or a benzene residue of the formula (7e) 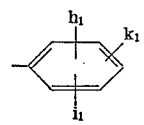

where $h_1$ and $k_1$ are identical or different and each represents a hydrogen, chlorine or bromine atom, or an alkyl group containing up to 9 carbon atoms, and $i_1$ represents a hydrogen, chlorine or bromine atom, a hydroxyl, carbamyl, phenyl or cyclohexyl group, or an alkoxy or alkenyl group containing up to 4 carbon atoms.

As examples of compounds of the present invention, or of compounds accessible by the present process, there may be mentioned triazine derivatives in which the residues —R, —X—A and —Y—B are represented by the following substituents:

| No. | —R | —X—A | —Y—B |
|---|---|---|---|
| 8 | 4-OH, 1-OH-phenyl (OH, OH) | —NH—(CH₂)₇—CH₃ | —S—(CH₂)₃—CH₃ |
| 9 | 2-OH, 4-OCH₃-phenyl | —NH—(CH₂)₇—CH₃ | —S—(CH₂)₃—CH₃ |
| 10 | 2-OH, 4-O—(CH₂)₁₁—CH₃-phenyl | —NH—(CH₂)₇—CH₃ | —S—(CH₂)₃—CH₃ |
| 11 | 2-OH, 4-O—CH₂CH₂OH-phenyl | —NH—(CH₂)₇—CH₃ | —S—(CH₂)₃—CH₃ |
| 12 | 2-OH, 4-O—CH₂—CH₂—CH₂—Cl-phenyl | —NH—(CH₂)₇—CH₃ | —S—(CH₂)₃—CH₃ |
| 13 | 2-OH, 4-O—CH₂CH₂CH₂—CN-phenyl | —NH—(CH₂)₇—CH₃ | —S—(CH₂)₃—CH₃ |
| 14 | 2-OH, 4-O—CH₂—C(=O)OCH₃-phenyl | —NH—(CH₂)₇—CH₃ | —S—(CH₂)₃—CH₃ |

| No. | −R | −X−A | −Y−B |
|---|---|---|---|
| 15 | 3-OH, 4-O−CH$_2$−CH$_2$−CH$_2$=CH$_2$ phenyl | −NH−(CH$_2$)$_7$−CH$_3$ | −S−(CH$_2$)$_3$−CH$_3$ |
| 16 | 3-OH, 4-OH phenyl | −O−C$_6$H$_5$ | −S−C$_6$H$_5$ |
| 17 | 3-OH, 4-OC$_2$H$_5$ phenyl | −O−C$_6$H$_5$ | −S−C$_6$H$_5$ |
| 18 | 3-OH, 4-O−(CH$_2$)$_3$−CH$_3$ phenyl | −O−C$_6$H$_5$ | −S−C$_6$H$_5$ |
| 19 | 3-OH, 4-O−(CH$_2$)$_7$−CH$_3$ phenyl | −O−C$_6$H$_5$ | −S−C$_6$H$_5$ |
| 20 | 3-OH, 4-O−(CH$_2$)$_{17}$−CH$_3$ phenyl | −O−C$_6$H$_5$ | −S−C$_6$H$_5$ |
| 21 | 3-OH, 4-O−CH$_2$−CH=CH$_2$ phenyl | −O−C$_6$H$_5$ | −S−C$_6$H$_5$ |
| 22 | 3-OH, 4-O−CH$_2$−C(=O)−OCH$_3$ phenyl | −O−C$_6$H$_5$ | −S−C$_6$H$_5$ |
| 23 | 3-OH, 4-O−CH$_2$−C(=O)−OC$_2$H$_5$ phenyl | −O−C$_6$H$_5$ | −S−C$_6$H$_5$ |
| 24 | 3-OH, 4-O−C(=O)−C$_6$H$_5$ phenyl | −O−C$_6$H$_5$ | −S−C$_6$H$_5$ |
| 25 | 3-OH, 4-O−C(=O)−C$_6$H$_4$−Cl phenyl | −O−C$_6$H$_5$ | −S−C$_6$H$_5$ |
| 26 | 3-OH, 4-O−C(=O)−NH−CH$_3$ phenyl | −O−C$_6$H$_5$ | −S−C$_6$H$_5$ |
| 27 | 3-OH, 4-O−C(=O)−NH−(CH$_2$)$_3$−CH$_3$ phenyl | −O−C$_6$H$_5$ | −S−C$_6$H$_5$ |
| 28 | 3-OH, 4-O−C(=O)−NH−C$_6$H$_5$ phenyl | −O−C$_6$H$_5$ | −S−C$_6$H$_5$ |
| 29 | 3-OH, 4-OH phenyl | −O−C$_6$H$_4$−C(CH$_3$)$_3$ | −S−(CH$_2$)$_7$−CH$_3$ |
| 30 | 3-OH, 4-OC$_2$H$_5$ phenyl | −O−C$_6$H$_4$−C(CH$_3$)$_3$ | −S−(CH$_2$)$_7$−CH$_3$ |
| 31 | 3-OH, 4-O−(CH$_2$)$_3$−CH$_3$ phenyl | −O−C$_6$H$_4$−C(CH$_3$)$_3$ | −S−(CH$_2$)$_7$−CH$_3$ |
| 32 | 3-OH, 4-O−(CH$_2$)$_7$−CH$_3$ phenyl | −O−C$_6$H$_4$−C(CH$_3$)$_3$ | −S−(CH$_2$)$_7$−CH$_3$ |

| No. | —R | —X—A | —Y—B |
|---|---|---|---|
| 33 | 2-OH, 5-O(CH₂)₁₇CH₃ phenyl | —O—C₆H₄—C(CH₃)₃ (para) | —S—CH₃ |
| 34 | 2-OH, 5-O-CH₂-CH=CH₂ phenyl | —O—C₆H₄—CH₃ (para) | —S—C₆H₄—CH₃ (para) |
| 35 | 2-OH, 5-O-CH₂-C₆H₅ phenyl | —O—C₆H₄—CH₃ (para) | —S—C₆H₄—Cl (para) |
| 36 | 2-OH, 5-O-CH₂-C(=O)-OC₂H₅ phenyl | —O—C₆H₃(CH₃)— (o-methyl) | —S—C₆H₄—CH₃ (para) |
| 37 | 2-OH, 5-O-C(=O)-CH₃ phenyl | —O—C₆H₃(CH₃)— (o-methyl) | —S—C₆H₅ |
| 38 | 2-OH, 5-O-C(=O)-C₆H₅ phenyl | —O—C₆H₃(CH₃)— (o-methyl) | —S—(CH₂)₇—CH₃ |
| 39 | 2-OH, 5-O-C(=O)-NH-CH₃ phenyl | —O—C₆H₄—C(CH₃)₃ (para) | —S—(CH₂)₃—CH₃ |
| 40 | 2-OH, 5-O-C(=O)-NH-(CH₂)₃-CH₃ phenyl | —O—C₆H₃(CH₃)(Cl)— | —NH—(CH₂)₇CH₃ |
| 41 | 2-OH, 5-O-C(=O)-NH-C₆H₅ phenyl | —O—C₆H₄—Cl (para) | —NH—(CH₂)₁₇—CH₃ |
| 42 | 2-OH, 5-OH phenyl | —O—C₆H₄—OCH₃ (para) | —S—CH₃ |
| 43 | 2-OH, 5-OC₂H₅ phenyl | —O—C₆H₃(CH₃)(Cl)— | —S—C₆H₅ |
| 44 | 2-OH, 5-O(CH₂)₃—CH₃ phenyl | —O—C₆H₃(CH₃)(Cl)— | —S—C₆H₄—Cl (para) |
| 45 | 2-OH, 5-O(CH₂)₇—CH₃ phenyl | —O—C₆H₃(CH₃)(Cl)— | —S—(CH₂)₃—CH₃ |
| 46 | 2-OH, 5-O(CH₂)₁₇—CH₃ phenyl | —O—C₆H₄—Cl (para) | —S—C₆H₅ |
| 47 | 2-OH, 5-O-CH₂-CH=CH₂ phenyl | —O—C₆H₄—Cl (para) | —S—(CH₂)₇—CH₃ |
| 48 | 2-OH, 5-O-CH₂-C₆H₅ phenyl | —O—C₆H₃(Cl)(Cl)— (2,4-dichloro) | —S—C₆H₅ |
| 49 | 2-OH, 5-O-CH₂-C(=O)-OC₂H₅ phenyl | —O—C₆H₃(Cl)(Cl)— (2,4-dichloro) | —S—CH(CH₃)(CH₂)₇— |

| No. | —R | —X—A | —Y—B |
|---|---|---|---|
| 50 | 4-OH-phenyl-O-C(=O)-CH₃ | -O-(2-C₃H₇, 5-CH₃-phenyl) | -NH-phenyl |
| 51 | 4-OH-phenyl-O-C(=O)-phenyl | -O-(2-C₃H₇, 5-CH₃-phenyl) | -NH-(CH₂)₃CH₃ |
| 52 | 4-OH-phenyl-O-C(=O)-NH-CH₃ | -O-(2-C₃H₇, 5-CH₃-phenyl) | -S-(CH₂)₇-CH₃ |
| 53 | 4-OH-phenyl-O-C(=O)-NH-(CH₂)₃-CH₃ | -O-(2-C₃H₇, 5-CH₃-phenyl) | -NH-(4-Cl-phenyl) |
| 54 | 4-OH-phenyl-O-C(=O)-NH-phenyl | -O-(2-C₃H₇, 5-CH₃-phenyl) | -S-(CH₂)₇-CH₃ |
| 55 | 4-OH-phenyl-OH | -O-C₂H₅ | -S-(CH₂)₇-CH₃ |
| 56 | 4-OH-phenyl-OC₂H₅ | -O-C₂H₅ | -S-phenyl |
| 57 | 4-OH-phenyl-O-(CH₂)₃-CH₃ | -O-C₂H₅ | -NH-(CH₂)₃-CH₃ |
| 58 | 4-OH-phenyl-O-(CH₂)₃-CH₃ | -O-C₂H₅ | -NH-(CH₂)₃-CH₃ |
| 59 | 4-OH-phenyl-O-(CH₂)₁₇-CH₃ | -O-CH₂-CH₂-O-CH(CH₃) | -S-(CH₂)₃-CH₃ |
| 60 | 4-OH-phenyl-O-CH₂-CH=CH₂ | -O-CH₂-CH₂-O-CH(CH₃) | -S-phenyl |
| 61 | 4-OH-phenyl-O-CH₂-phenyl | -O-CH₂-CH₂-O-CH(CH₃) | -NH-(CH₂)₇CH₃ |
| 62 | 4-OH-phenyl-O-CH₂-C(=O)-OC₂H₅ | -O-(4-C₉H₁₉-phenyl) | -S-phenyl |
| 63 | 4-OH-phenyl-O-C(=O)-CH₃ | -O-(4-C₉H₁₉-phenyl) | -NH-CH₃ |
| 64 | 4-OH-phenyl-O-C(=O)-phenyl | -O-(4-C₉H₁₉-phenyl) | -S-(CH₂)₃-CH₃ |
| 65 | 4-OH-phenyl-O-C(=O)-NH-CH₃ | -O-(4-C₈H₁₇-phenyl) | -S-phenyl |

| No. | —R | —X—A | —Y—B |
| --- | --- | --- | --- |
| 66 | 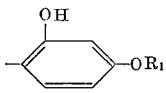—O—C(=O)—NH—(CH$_2$)$_3$—CH$_3$ | —O—⟨phenyl⟩—C$_8$H$_{17}$ | —S—(CH$_2$)$_3$—CH$_3$ |
| 67 | 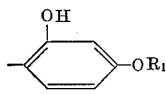—O—C(=O)—NH—⟨phenyl⟩ | —O—⟨phenyl⟩—C$_8$H$_{17}$ | —S—(CH$_2$)$_7$—CH$_3$ |

The new aryl-1,3,5-triazines of the general Formula 2 are obtained by introducing in a cyanuric halide which contains chlorine or bromine as halogen (a) the residue —X—A by reaction with one mol of a compound of the formula H—X—A,
(b) the residue —Y—B by reaction with one mol of a compound of the formula H—Y—B and
(c) the residue R, or preferably a residue of the formula

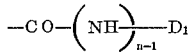

(where R$_1$ represents a hydrogen atom, an alkenyl group containing up to 9 carbon atoms, a possibly substituted alkyl group, an aralkyl group, or a residue of the formula $$-CO-\left(NH\right)_{n-1}-D_1$$

[where n=1 or 2 and D$_1$ stands for an alkyl or cycloalkyl group or a possibly substituted phenyl group]) by reaction with 1 mol of a 2,4 - dihydroxybenzene compound containing at least one unsubstituted as-position, in the presence of a Friedel-Crafts catalyst in an anhydrous organic solvent that is inert towards the reactants, the order in which these substituents are introduced being optional, and, possibly the hydroxyl group in para-position to the triazine ring is etherified, esterified or converted into a urethane group. It has proved advantageous to perform this process by first reacting in each case 1 mol of the compound H—X—A and H—Y—B respectively with cyanuric chloride and then to introduce the residue R or the residue

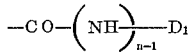

as described above.

The reaction of the process step (c) is preferably carried out with anhydrous aluminium chloride as Friedel-Crafts catalyst and in the presence of nitrobenzene, benzene, chlorobenzene, dichlorobenzene or carbon tetrachloride or a similar inert organic solvent at a temperature from 0° to 150° C., depending on the reactivity of the components. Further suitable Friedel-Crafts catalysts are ZnCl$_2$, SnCl$_4$ and BF$_3$. Whereas for the condensation partners normally approximately molecular proportions (if required or desired a moderate excess or shortfall of one component) are used, the amount of Friedel-Crafts catalyst ranges in general from about 0.8 to 1.5 mols.

Preferred compounds of the benzene series, corresponding to the residue R, for this reaction are 2,6-dihydroxy-toluene, 1,3,5-trihydroxybenzene and especially 1,3-dihydroxybenzene.

The reaction of the process steps (a) and (b) is preferably performed in an aqueous medium containing organic water-soluble, inert solvents, in the presence of an acid acceptor. Suitable reaction media are aqueous media containing as the water-miscible solvent inert towards the reactants substances such, for example, as acetone, dioxan or the like. Suitable acid acceptors are inter alia alkali metal hydroxides or carbonates. The pH value of the reaction medium should, if possible, not rise above 7 during the reaction and should preferably remain in the weakly acid region.

Reaction temperatures suitable for the exchange of the first triazine chlorine atom of cyanuric chloride are within the range from about 0° to 20° C., while for the exchange of the second chlorine atom the range from about 10° to 70° C. may be used. Acid acceptors may be dispensed with if the compounds H—XA and/or H—Y—B are used in the form of their metal salts, preferably the alkali metal salts. On the other hand, there is no objection to performing the reaction under anhydrous conditions in an inert solvent (for example mono-, di- or trichlorobezene) at an elevated temperature (for example from 80 to 180° C.), advantageously in the presence of a small amount of aluminium chloride or of an equivalent of an acid acceptor, for example sodium bicarbonate.

From the large number of compounds H—X—A and H—Y—B suitable for these reactions there may be mentioned as examples:

(a) Alcohols and phenols:
Methanol, octyl alcohol, octadecyl alcohol, $$CH_3-O-CH_2-CH_2-OH$$

CH$_3$(CH$_2$)$_3$—O—CH$_2$—CH$_2$—OH, allyl alcohol, crotyl alcohol, cyclohexanol, benzyl alcohol, phenol, β-naphthol, α-tetrahydronaphthol, 4-hydroxy-3,5-ditertiary butylphenol, ortho-cresol, 4-nonyl-phenol, 2-methyl-5-isopropylphenol (carvacrol), 2,4-di-tertiary butylphenol, pentamethylphenol, 2 - methoxyphenol (guaiacol), 2-tertiary butyl-4-methoxyphenol, 2-methoxy-4-propenylphenol (isoeugenol), 2,4,6-tricarboxyphenol (gallic acid), 4-carbethoxyphenol, 3-diethylaminophenol, 2-carbaminophenol, 2-carbanilinophenol, 2,4,5-trichlorophenol, 2,4,6-tribromophenol, 4-chloro-3,5-dimethylphenol, 3-nitrophenol, 4-cyclohexylphenol, 4-phenylphenol and cumylphenol.

(b) Thioalcohols and thiophenols:
Thiophenol, ortho-, meta- and para-thiocresol, para-chlorothiophenol, methylmercaptan, n-octylmercaptan, n-octadecylmercaptan, allylmercaptan, β-thionaphthol, CH$_3$—CH$_2$—CH$_2$—S—CH$_2$—CH$_2$—SH and benzylmercaptan.

(c) Amines containing at least one amine hydrogen atom:
Monomethylamine, isobutylamine, n-dodecylamine, n-octadecylamine, benzylamine, allylamine, diethylamine, ethyl-n-butylamine, 1-amino-2- or -4-chlorobenzene, aniline, 1-amino-2,4- or -3,4-dichlorobenzene, 1-amino-2, -3- or -4-methylbenzene, 1-amino-2-methyl-5-isopropylbenzene, 1-amino-2-, -3- or -4-methoxybenzene, diphenylamine, N-methylphenylamine, N-n-butylphenylamine and morpholine.

According to a variant of the process described above residues —X—A and Y—B are also accessible by exchange reactions with other residues —X—A and/or —Y—B already present in the molecule of compounds of the Formula 2, that is to say, for example, by transesterifications, transamidations or the like with other alcohols, amines, mercaptans, phenols, or thiophenols in the presence of a suitable catalyst, for example an alkali metal, zinc chloride, an alkali metal hydroxide, metal alcoholate or the like. In this manner it is easy, for example, to exchange an aryloxy radical for an alkoxy radical, or to manufacture compounds of the type

—NH—A in an advantageous manner from esters —O—A.

The substituents of the types R, A and B introduced as described above may be subjected to further reactions, amongst which further reactions of hydroxyl groups in the substituent R are of special practical importance. For example, etherification of such hydroxyl groups may give rise to technically valuable products; particularly suitable reagents for such etherifications are, for example, ethylene-chlorohydrin, n-allylbromide, n-bromo octane, n-bromooctadecane, benzylchloride, para-chlorobenzylchloride, crotylbromide, γ-bromobutyronitrile, chloroacetic acid ethyl ester, γ-bromobutyric acid ethyl ester, 1-chloro-3-bromopropane, phenylacylbromide, bromoacetic acid methyl ester, bromoacetic acid or bromopropionic acid amide, dimethylsulphate and diethylsulphate.

Of equal practical value are further reactions with isocyanates of the formula $D_1$—N=C—O where $D_1$ has the same meaning as in Formula 3. As relevant examples there may be mentioned:

Methyl isocyanate, n-butyl isocyanate, dodecyl isocyanate, octadecyl isocyanate, cyclohexyl isocyanate, phenyl isocyanate, para-ethoxyphenyl isocyanate, para-chlorophenyl isocyanate, ortho-tolylisocyanate and para-tolylisocyanate.

The acid halides and acid anhydrides suitable for possible further reactions correspond, for example, to the formulae

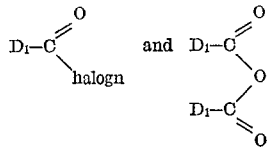

where $D_1$ has the same meaning as in the Formula 3.

As acid halides and acid anhydrides of the above formulae there may be mentioned, for example, those of the following acids:

Acetic, butyric, stearic, benzoic, salicylic, para-chlorobenzoic, para-tertiary butylbenzoic and para-methoxybenzoic acid.

The new aryl-1,3,5-triazines of the present invention may be used as stabilizers against the actions of light, atmospheric oxygen and heat for a very wide variety of organic materials. Surprisingly, the compounds defined above display in contrast to chemically closely related types of compounds a specific effect as antioxidants for high-molecular organic substances that are susceptible to oxidative degradation. In view of the fact that most of the products of this invention act at the same time as light filters—especially against ultraviolet radiation—they are of special value for a large number of applications.

High-molecular organic substances that can be protected from oxidative attacks with the substances of this invention belong, for example, to the following groups of products: Synthetic materials obtained by polymerization or copolymerization, for example, polyacrylonitrile, polyvinylchloride or polyolefines such as polyethylene and polypropylene, or those which are accessible by polycondensation, such as polyesters and above all polyamides, furthermore polyadducts such as polyurethanes.

Lacquers and films of various compositions, for example those from acetyl cellulose, cellulose propionate, cellulose butyrate and cellulose mixtures, for example, cellulose acetate-butyrate or cellulose acetate-propionate; furthermore nitrocellulose, vinyl acetate, polyvinylchloride, polyvinylidenechloride, copolymers from vinylchloride and vinylidenechloride; alkyd lacquers, polyethylene, polypropylene, polyamides, polyacrylonitrile, polyesters, polycarbonates, polyurethanes and the like. Natural, rubber-like materials such as rubber, balata, gutta percha, or synthetic vulcanizable materials such as polychloroprene, olefinic polysulphides, polybutadiene or copolymers from butadiene-styrene (for example Buna S) or from butadiene-acrylonitrile (for example Buna N), which may further contain fillers, pigments, vulcanization accelerators or the like and to which the hydroxyphenyl-1,3,5-triazines are added to delay ageing and thereby to prevent a change in the plasticity properties and the embrittlement.

Cosmetic preparations such as perfumes, dyed and undyed soaps and bath salts, skin and face creams, powders, repellants and especially sunburn oils and creams.

Depending on the nature of the substances to be protected, the new aryl-1,3,5-triazines may be incorporated with them or applied to them in a variety of ways.

(1) For example, the protective agent may be incorporated with the synthetic, organic, high-molecular material to be protected already in the final stage of its manufacture or during the working up operation. Alternatively, the protective agent may be applied to the surface layer, or it may be incorporated during the manufacture of the finished product.

(2) The protective agent may also be incorporated with a substrate in order to protect one or several other substances present in the substrate, for example dyestuffs, auxiliaries or the like, whereby at the same time the above-mentioned protection is afforded to the high-molecular organic material.

Finally, the protective agent—especially when used for protecting fibrous substrates of natural or synthetic origin—may be applied at any stage of the final processing, that is to say while it is dressed, rendered crease-resistant, dyed, finished or the like, to the material to be protected, by fixing in a manner similar to a dyeing process. Thus, the protective agents of this invention are also of considerable importance to the protection of textile organic materials, for example woven or knitted fabrics, fibre fleeces, nap substrates and the like.

Thus, the process of this invention for protecting high-molecular organic substances from the harmful effects of light, heat and especially oxidative agencies consists in incorporating a new aryl-1,3,5-triazines of the Formula 2 with, or fixing it on, the organic material to be protected itself or a substrate containing said material.

Depending on the kind of material to be protected, the potency and durability and other properties of the protection to be achieved, the amount of stabilizer, especially light filter, to be incorporated with the material may vary within rather wide limits, for example from about 0.01 to 10%, preferably from 0.1 to 2%, of the material to be protected directly from the harmful effects of heat, air and especially ultraviolet radiation.

Unless otherwise indicated, parts and percentages in the following examples are by weight. The melting points are uncorrected.

Example 1

3.51 parts of the compound of the formula (68)

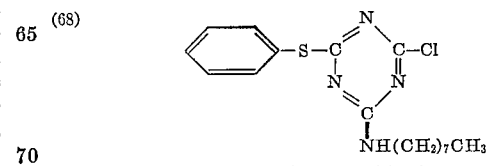

(prepared from 2,4-dichloro-6-thiophenoxy-1,3,5-triazine and n-octylamine in acetone with N-sodium hydroxide solution as acid acceptor, or from 2,4-dichloro-6-thiophenoxy-1,3,5-triazine and n-octylamine in dichlorobenzene, in the presence of aluminum chloride at 150° C.)

are dissolved in 50 parts of benzene, and 2 parts of resorcinol and 1.5 parts of aluminum chloride are added to this solution. The reaction solution is then stirred for 16 hours at 50° C., for working up poured into water and the solvent is expelled with steam. The yellowish crude product is obtained in a yield of about 3.8 parts. After two recrystallizations from chloroform+cyclohexane the product of the formula

(69)
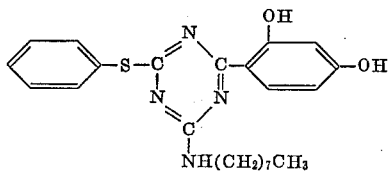

melts at 196 to 197° C. and displays the following analytical data: $C_{23}H_{28}O_2N_4S$: Calculated, percent, C, 65.07; H, 6.65; N, 13.20. Found, C, 64.84; H, 6.64; N, 12.96.

Example 2

8.1 parts of the compound of the Formula 69 are dissolved in 40 parts of acetone, and 20 parts of N-sodium hydroxide solution and 1 part of sodium carbonate are added. The resulting red solution is mixed at 45° C. with 3.41 parts by volume of diethylsulphate and the batch is stirred for 19 hours at this temperature.

For working up the reaction mixture it is poured into 400 parts of water, and the precipitated product is suctioned off, washed with dilute hydrochloric acid and then with water, and dried at 70° C. under vacuum. Yield: 7.3 parts.

After two recrystallizations from chloroform+hexane, the product of the formula

(70)
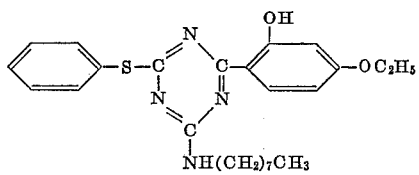

melts at 151.5° C. and reveals the following analytical data: $C_{25}H_{32}O_2N_4S$: Calculated, percent, C, 66.34; H, 7.13; N, 12.88. Found, C, 66.10; H, 7.18; N, 12.59.

Example 3

22.3 parts of the compound of the formula

(71)
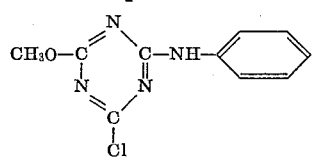

(prepared from 2,4-dichloro-6-methoxy-1,3,5-triazine and aniline) are mixed with 13.0 parts of resorcinol and 26.0 parts of aluminum trichloride in 150 parts of nitrobenzene, and the whole is stirred for 18 hours at 40 to 45° C. For working up the reaction mixture it is poured into water, the nitrobenzene expelled with steam and the faintly yellowish residue is suction-filtered. After drying, there are obtained about 20 parts of the compound of the formula

(72)
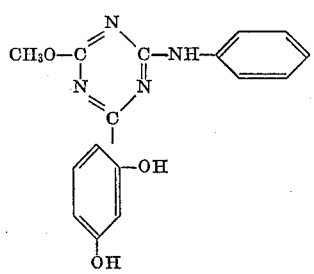

After three recrystallizations from dimethylformamide+methanol the product melts at about 340° C. with decomposition and reveals the following analytical data: $C_{16}H_{14}O_3N_4 \cdot C_3H_7NO$: Calculated, percent, C, 59.52; H, 5.52; N, 18.27. Found, C, 58.94; H, 5.19; N, 18.45.

Example 4

42 parts of 2-(4'-tertiary butylphenoxy)-4-thiophenoxy-6-chlorotriazine (prepared from 2,4-dichloro-6-thiophenoxy-1,3,5-triazine and para-tertiary butylphenol in dioxane with addition of sodium hydroxide solution as acid acceptor) are dissolved in 220 parts of nitrobenzene with 13.2 parts of resorcinol; 32 parts of aluminum chloride in portions are added and the whole is stirred for 2 days at 18 to 22° C.

After decomposition in 300 parts of ice and 500 parts of water, the organic phase is decanted to free it from the acid and the nitrobenzene is expelled by steam distillation. After drying, there are obtained 45.1 parts of the product of the formula

(73)
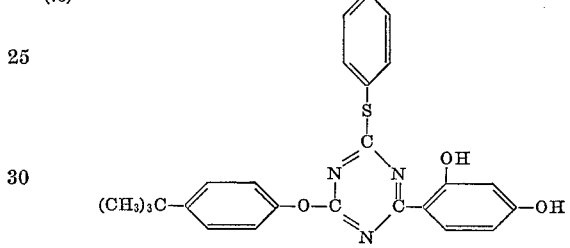

The analytically pure product, obtained by two recrystallizations from benzene, melts on being slowly heated at 188 to 191° C. When it is introduced at 160° C. into a melting-point apparatus, it melts immediately right through, solidifies again and then likewise melts at 188 to 191° C. $C_{25}H_{25}O_3N_3S$: Calculated, percent, C, 67.40; H, 5.20; N, 9.43. Found, C, 67.47; H, 5.14; N, 9.27.

Example 5

96.4 parts of the compound of the formula

(74)
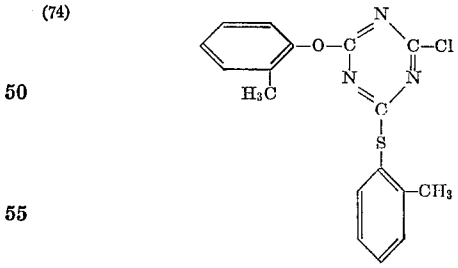

(prepared by dropping one equivalent of normal sodium hydroxide solution into an acetonic solution of one equivalent each of 2,4-dichloro-6-(2'-methylphenoxy)-1,3,5-triazine and 2-methylthiophenol at −5° C. and a pH value of 6.5, and subsequent pouring into water; melting point: 95 to 97° C.) are suspended together with 33 parts of resorcinol for half an hour in 320 parts of anhydrous nitrobenzene. 42.6 parts of anyhydrous aluminum chloride in portions are then added at 5 to 10° C. The batch is stirred for 4 hours at 18 to 22° C., then for 3 hours at 35° C. and for 22 hours at 50 to 55° C., then cooled to room temperature, and the reaction product is poured over 1200 parts of a mixture of ice and water. The batch is decanted three times with water, the nitrobenzene expelled by steam distillation, and the precipitated product is suction-filtered and washed with water. After drying, the product is recrystallized from toluene, to yield 82.5 parts of the compound of the formula

(75)
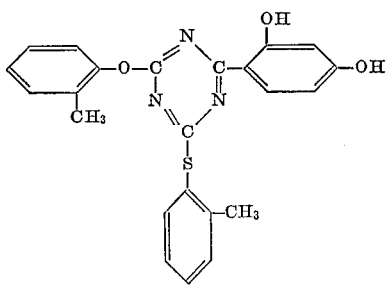

melting at 191 to 192° C. Analytical data: $C_{23}H_{19}O_3N_3S$: ½ toluene, percent, Calculated, C, 66.90; H, 4.68; N, 9.77. Found, C, 66.84; H, 4.87; N, 10.01.

Example 6

8.35 parts of the compound of the Formula 75 and 1.25 parts of potassium hydroxide of 89% purity are dissolved in 15 parts of dimethyl sulphoxide at 18 to 22° C. There are then added 25 parts of alcohol and immediately following 4.2 parts of n-bromooctane to the solution; the whole is stirred for 22 hours at 35 to 40° C., then cooled in ice, the precipitated product is suctioned off and the precipitate washed with alcohol, then with normal hydrochloric acid and finally with water. After recrystallization from methylenechloride+methanol, 4.5 parts of the compound of the formula

(76)
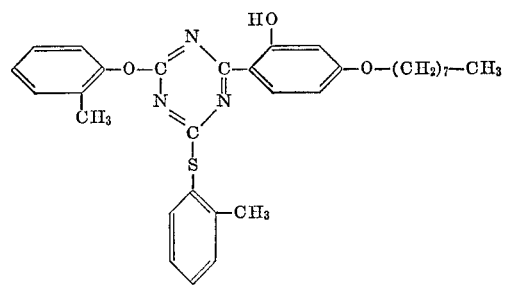

are obtained; it melts at 76 to 77° C. and reveals the following analytical data: $C_{31}H_{35}O_3N_3S$: Calculated, percent, C, 70.29; H, 6.66; N, 7.93. Found, C, 70.29; H, 6.63; N, 7.99.

Example 7

78.75 parts of the compound of the formula

(77)
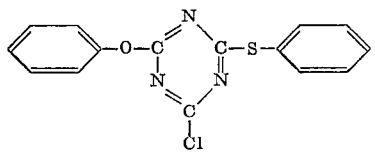

(prepared by dropping a solution of 20.5 parts of sodium hydroxide in 200 parts of water into an acetonic solution of 121 parts of 2,9-dichloro-6-phenoxy-1,3,5-triazine and 56 parts of thiophenol at −5° C. and a pH above 7, followed by pouring the whole into water; melting point: 52 to 54° C.) are dissolved together with 28.5 parts of resorcinol in 280 parts of nitrobenzene at 50° C., and 32 parts of aluminum chloride are then added at a rate such that the temperature does not rise above 50° C. On completion of the addition of aluminum chloride the batch is stirred for 12 hours at 80° C., then poured into water, and the nitrobenzene is expelled with steam. On recrystallization from chlorobenzene there are obtained 67 parts of the product of the formula

(16)
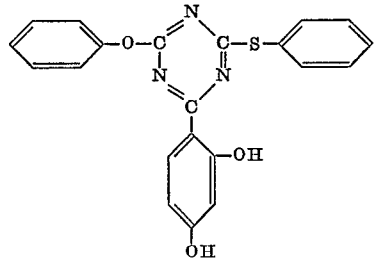

melting at 202 to 205° C. It reveals the following data in the elementary analysis: $C_{21}H_{15}O_3N_3S$: Calculated, percent, C, 64.77; H, 3.88; N, 10.79. Found, C, 64.60; H, 4.04; N, 10.83.

Example 8

A mixture of 11.67 parts of the compound of the Formula 16, 3.3 parts of acetic anhydride and 60 parts of chlorobenzene is refluxed for 5 hours. The solution, which has become clear, is boiled with one part of bleaching earth (Tonsil F) and suction-filtered while still hot. The hot filtrate is mixed with 250 parts of methanol and then stirred for 30 minutes in an ice bath. The precipitated product (10.5 parts) is purified by being chromatographed once on alumina (activity III) with benzene. Yield: 10.35 parts of the compound of the formula

(78)
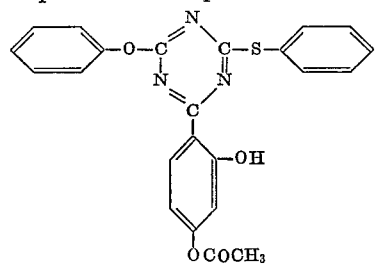

melting at 159 to 160° C. Analytical data: $C_{23}H_{17}O_4N_3S$: Calculated, percent, C, 64.03; H, 3.97; N, 9.74. Found, C, 64.20; H, 4.24; N, 9.66.

Example 9

A solution of 9.7 parts of the compound of the Formula 16 in 50 parts of triethylamine is mixed with 2.5 parts of methyl isocyanate refluxed for 5 minutes. The reaction solution is then stirred until cold, mixed with 100 parts of petroleum ether, and the precipitated product of the formula

(26)
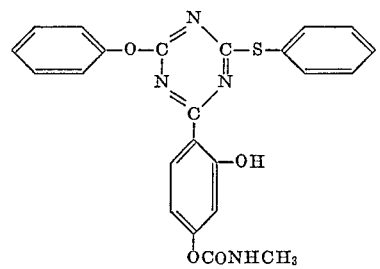

is suctioned off and rinsed with petroleum ether. Yield: 10.95 parts. Melting point: 172 to 182° C. Analytical data: $C_{23}H_{18}O_4N_4S$: Calculated, percent, C, 61.87; H, 4.06; N, 12.55. Found, C, 62.07; H, 4.32; N, 12.45.

The compounds listed in the following table can be prepared as described in the preceding examples, especially in Example 1. In this table there are shown in Column I—The number of the formula
Column II—The structural formula
Column III—The melting point in ° C.
Column IV—Analytical data for C, H, N; the upper line gives the calculated values and the lower line the values found; underneath: empirical formula.

| I | II | III | IV |
|---|---|---|---|
| 79 | (structure) | 105–107/135–137 | 68.48  5.75  8.87<br>68.66  5.78  9.03<br>$C_{27}H_{27}O_3N_3S$ |
| 80 | (structure) | 257–259 | 65.10  5.84  10.47<br>64.77  5.62  10.55<br>$C_{29}H_{31}O_4N_4Cl$ |
| 81 | (structure) | 187–188 | 66.12  6.27  9.95<br>66.12  6.13  10.02<br>$C_{31}H_{35}O_4N_4Cl$ |
| 82 | (structure) | 172–174 | 68.66  7.32  8.66<br>68.99  7.51  8.45<br>$C_{37}H_{47}O_4N_4Cl$ |
| 83 | (structure) | 141–142 | 67.40  5.20  9.43<br>67.40  5.28  9.46<br>$C_{25}H_{23}O_3N_3S$ |

| I | II | III | IV |
|---|---|---|---|
| 84 | 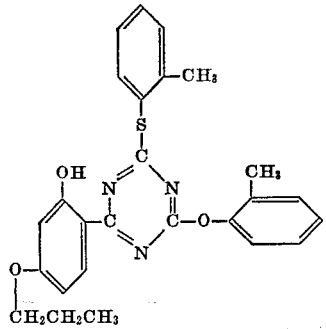 | 149 | 67.95 5.48 9.14<br>67.85 5.66 8.94<br>C$_{25}$H$_{25}$O$_3$N$_3$S |
| 85 | 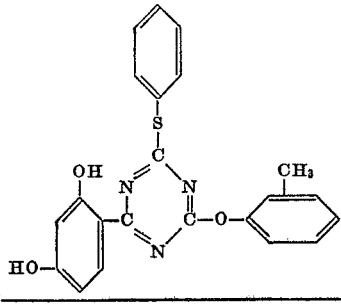 | 214–215 | 65.49 4.25 10.42<br>65.33 4.27 10.50<br>C$_{22}$H$_{17}$O$_3$N$_3$S |
| 86 | 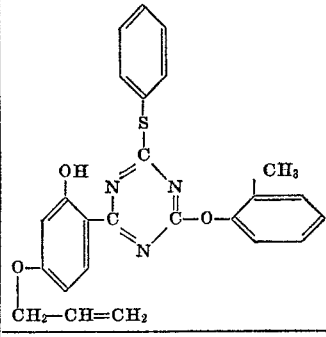 | 131–133 | 67.70 4.77 9.47<br>68.03 4.97 9.51<br>C$_{25}$H$_{21}$O$_3$N$_3$S |
| 87 | 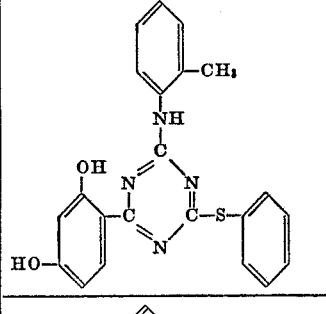 | 242–243 | 65.65 4.51 13.92<br>65.74 4.78 13.84<br>C$_{22}$H$_{18}$N$_4$O$_2$S |
| 88 | 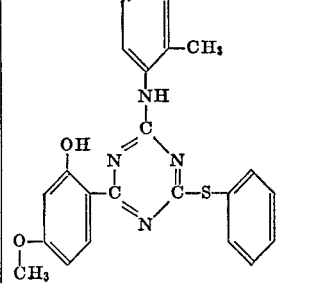 | 181–182 | 66.33 4.84 13.45<br>66.39 4.95 13.29<br>C$_{23}$H$_{20}$N$_4$O$_2$S |

| I | II | III | IV |
|---|---|---|---|
| 89 | 2-phenylthio-4-(2-hydroxy-4-(heptylcarbonyloxy)phenyl)-6-phenoxy-s-triazine; substituent: OCO(CH$_2$)$_6$CH$_3$ | 88–90 | 67.55  5.67  8.15<br>67.55  5.60  8.18<br>C$_{29}$H$_{29}$O$_4$N$_3$S |
| 90 | substituent: OCO(CH$_2$)$_{16}$CH$_3$ | 86.8–87.3 | 71.42  7.53  6.41<br>71.66  7.69  6.37<br>C$_{39}$H$_{49}$O$_4$N$_3$S |
| 24 | substituent: OCO–phenyl | 162–162.5 | 68.14  3.88  8.51<br>68.86  3.91  8.44<br>C$_{28}$H$_{19}$O$_4$N$_3$S |
| 91 | substituent: OCH$_3$ | 124–125 | 65.49  4.25  10.42<br>65.72  4.18  10.24<br>C$_{22}$H$_{17}$O$_3$N$_3$S |
| 23 | substituent: OCH$_2$COOC$_2$H$_5$ | 130–133.5 | 63.15  4.45  8.84<br>63.33  4.44  8.94<br>C$_{25}$H$_{21}$O$_5$N$_3$S |

| I | II | III | IV |
|---|---|---|---|
| 92 | 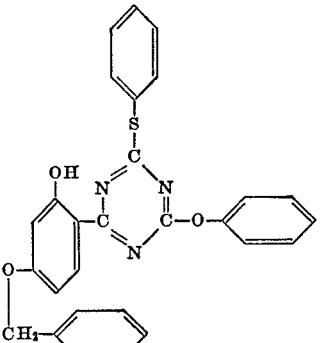 | 162.5–163.5 | 70.13  4.41  8.76<br>70.13  4.52  8.46<br>$C_{28}H_{21}O_3N_3S$ |
| 93 | 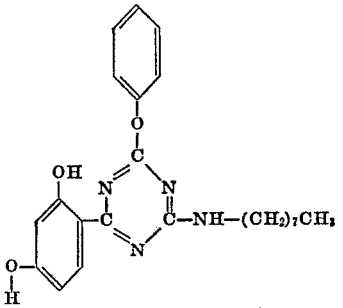 | 178–179 | 67.62  6.91  13.72<br>67.60  7.03  13.81<br>$C_{23}H_{28}O_3N_4$ |
| 94 | 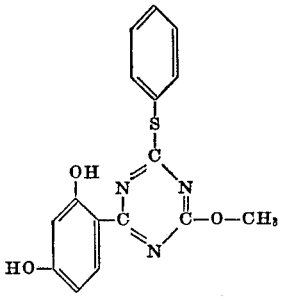 | 206–207 | 58.70  4.00  12.84<br>58.88  3.98  12.65<br>$C_{16}H_{13}O_3N_3S$ |
| 95 | 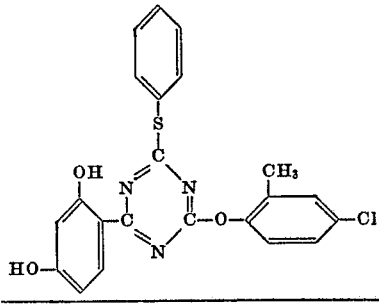 | 110–111.5 | 60.34  3.68  9.60<br>60.38  3.78  9.44<br>$C_{22}H_{16}O_3N_3SCl$ |
| 43 | 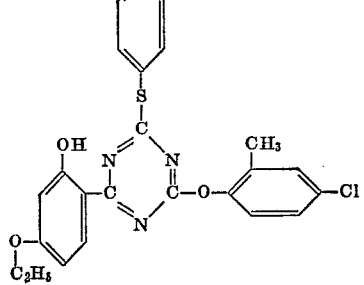 | 153–154 | 61.86  4.33  9.02<br>61.82  4.19  9.05<br>$C_{24}H_{20}O_3NSCl$ |

| I | II | III | IV |
|---|---|---|---|
| 96 | (structure: triazine with SPh, OH-benzyloxy-phenyl, and O-(methyl-chlorophenyl)) | 170–171 | 65.97　4.20　7.96<br>66.03　4.32　7.99<br>$C_{29}H_{22}O_3N_3ClS$ |
| 97 | (structure: triazine with SPh, OH-(CH₂COOC₂H₅)O-phenyl, and O-(methyl-chlorophenyl)) | 141–142 | 59.60　4.23　8.02<br>59.67　4.29　8.04<br>$C_{26}H_{22}O_5N_3ClS$ |
| 98 | (structure: triazine with S-tolyl, OH,HO-phenyl, and O-(methyl-chlorophenyl)) | 180.5–181.5 | 61.13　4.01　9.30<br>61.00　3.94　9.10<br>$C_{23}H_{18}O_3N_3SCl$ |
| 99 | (structure: triazine with S-tolyl, OH-ethoxy-phenyl, and O-(methyl-chlorophenyl)) | 123–127 | 62.56　4.62　8.75<br>62.81　4.64　8.89<br>$C_{25}H_{22}O_3N_3SCl$ |
| 100 | (structure: triazine with S-tolyl, OH-benzyloxy-phenyl, and O-(methyl-chlorophenyl)) | 162–163.5 | 66.47　4.46　7.75<br>66.45　4.65　7.86<br>$C_{30}H_{24}O_3N_3SCl$ |

| I | II | III | IV |
|---|---|---|---|
| 101 | (structure: phenyl-NH-C, triazine with OH-phenyl-OH substituent and O-(methyl-chloro-phenyl) substituent) | 186–188 | 63.52  4.40  12.88<br>63.59  4.50  12.80<br><br>$C_{23}H_{19}O_3N_4Cl$ |
| 102 | (structure: methyl-phenyl-NH-C, triazine with OH-phenyl-OC₂H₅ substituent and O-(methyl-chloro-phenyl) substituent) | 162–163 | 64.86  5.01  12.10<br>64.78  4.88  12.28<br><br>$C_{25}H_{23}O_3N_4Cl$ |
| 103 | (structure: methyl-phenyl-NH-C, triazine with OH-phenyl-OCH₂-phenyl substituent and O-(methyl-chloro-phenyl) substituent) | 135–136 | 68.63  4.80  10.67<br>68.79  4.78  10.56<br><br>$C_{30}H_{25}O_3N_4Cl$ |

Example 10

An acetylcellulose film about 50μ thick is prepared by pouring a 10% acetonic solution of acetylcellulose containing 1% (referred to acetylcellulose) of the compound of the Formula 94. After drying, the film reveals the following percent values of its light transmission:

| Wavelength in Mμ | Light transmission in percent | |
|---|---|---|
| | Unexposed | Exposed for 100 hours in a fadeometer |
| 260 to 340 | 0 | 0 |
| 350 | 3 | 3 |
| 360 | 26 | 26 |
| 370 | 70 | 70 |
| 380 | 85 | 84 |
| 390 | 89 | 88 |

The compounds of the Formulae 16, 78, 26 and 98 produce analogous effects.

Example 11

A paste from 100 parts of polyvinylchloride, 59 parts by volume of dioctyl phthalate and 0.2 part of the compound of the Formula 73 is rolled to and fro on a calender heated at 145° to 150° C. to make a film about 0.5 mm. thick. The polyvinylchloride film manufactured in this manner absorbs ultraviolet rays in the region from 280 to 360 mμ completely.

Instead of the compound of the Formula 73 there may be used, for example, one of the compounds of the Formulae 69, 75, 16, 24, 75, 78, 80, 81, 82, 83, 84, 86, 89, 90, 92, 97, 102 or 103.

Example 12

A mixture of 100 parts of polyethylene and 0.2 part of the compound of the Formula 16 is rolled to and fro on a calender heated at 130° to 140° C. to produce a film which is then pressed at 150° C.

The polyethylene film obtained in this manner is substantially impermeable to ultraviolet light within the region from 280 to 360 mμ.

Instead of the compound of the Formula 16 there may be used, for example, one of the compounds of the Formulae 67, 73, 75, 81, 83, 84, 86, 99 or 102.

Example 13

A mixture of 100 parts of polypropylene and 0.2 part of one of the compounds of the Formulae 24, 78, 83 or 89 is rolled on a calender at 170° C. to form a sheet which is then pressed to form a panel 1 mm. thick at 230 to 240° C. under a maximum pressure of 40 kg./cm.²

The panels obtained in this manner are impermeable to ultraviolet light within the region from 280 to 360 mμ and display after 500 hours' exposure on a fadeometer a substantially lesser embrittlement than specimens that do not contain the compounds referred to above. Similar results are obtained by using the compounds of the Formulae 43, 69, 70, 72, 73, 84, 97 and 99.

Example 14

0.2 part of the compound of the Formula 16 is dissolved in 1.8 parts of monostyrene and 0.5 part of a solution of cobalt naphthenate in monostyrene (containing 1% of cobalt) is added. There are then added 40 parts of an unsaturated polyester resin based on phthalic acid-maleic acid-ethylene-glycol and the whole is stirred for 10 minutes. 1.7 parts of a catalyst solution (methylethyl ketone peroxide in dimethylphthalate) are then dropped in and the thoroughly stirred, air-free mass poured in between two panes of glass. After about 20 minutes the 1 mm. thick polyester panel has solidified sufficiently to allow it to be removed from the mould. It is impermeable to ultraviolet light within the region from 280 to 360 m$\mu$.

Instead of the compound of the Formula 16 there may be used, for example, the compound of the Formula 82 or 83.

What is claimed is:

1. The nonsymmetrically substituted aryl-1,3,5-triazine of the formula

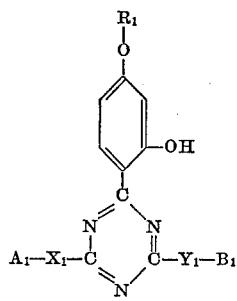

where $R_1$ represents a member selected from the group consisting of a hydrogen atom, an alkyl group containing up to 18 carbon atoms, an allyl group, a benzyl group, a carbalkoxy-alkyl group containing up to 8 carbon atoms, a group —CO—NH-alkyl containing up to 8 carbon atoms in the alkyl group, a group —CO—NH-phenyl, —CO-phenyl and —CO-alkyl, $X_1$ and $Y_1$ are different from each other and represent a divalent hetero atom grouping selected from the group consisting of —O—, —S— and —NH—, and $A_1$ and $B_1$ each represents a member selected from the group consisting of an alkyl group containing up to 20 carbon atoms, a phenyl group which may be substituted by a member selected from the group consisting of alkyl groups, alkoxy groups having up to 6 carbon atoms and halogen atoms.

2. The aryl-1,3,5-triazine according to claim 1, in which the substituent —O—$R_1$ of the formula shown in claim 1 is a member selected from the group consisting of hydroxyl group, an alkoxy group containing up to 18 carbon atoms, an allyloxy and a benzyloxy group.

3. The aryl-1,3,5-triazine according to claim 1 having the formula

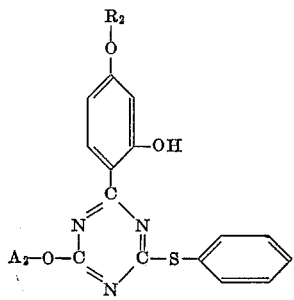

where $R_2$ stands for a member selected from the group consisting of a hydrogen atom, an alkyl group containing up to 18 carbon atoms, an allyl group, a benzyl group, a carbalkoxyalkyl group containing up to 8 carbon atoms, a group —CO— NH-alkyl containing up to 8 carbon atoms in the alkyl group, a group —CO—NH-phenyl, —CO-phenyl and —CO-alkyl, and $A_2$ represents a member selected from the group consisting of an alkyl group containing up to 18 carbon atoms, a phenyl group, a phenyl group substituted by halogen atoms, and a phenyl group substituted by alkyl groups containing up to 10 carbon atoms.

4. The aryl-1,3,5-triazine according to claim 1 having the formula

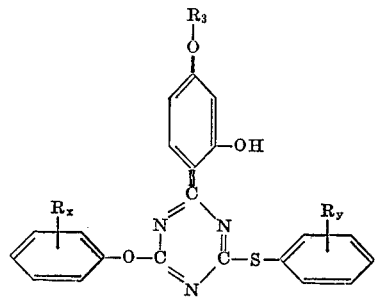

where $R_3$ represents a member selected from the group consisting of a hydrogen atom, an alkyl group containing up to 8 carbon atoms, an allyl group, a benzyl group, a carbalkoxyalkyl group containing up to 4 carbon atoms, an aliphatic acyl group containing up to 18 carbon atoms and a benzoyl group; $R_x$ stands for a member selected from the group consisting of a hydrogen atom, a hydroxyl group, an alkyl group containing up to 6 carbon atoms and a halogen atom, and $R_y$ stands for a member selected from the group consisting of a hydrogen atom, an alkyl group containing up to 4 carbon atoms and a halogen atom.

5. The aryl-1,3,5-triazine according to claim 1 having the formula

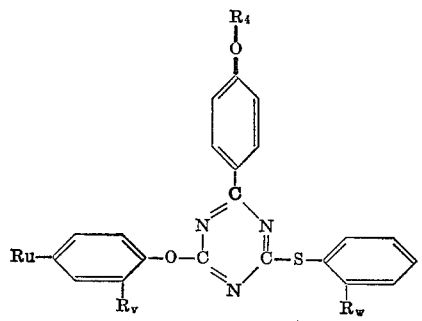

where $R_4$ represents a member selected from the group consisting of a hydrogen atom, an ethyl group, a benzoyl group and a group —CO—$C_nH_{2n+1}$ ($n=1$ to 17); $R_u$ stands for a member selected from the group consisting of hydrogen and chlorine, $R_v$ for a member selected from the group consisting of hydrogen and a methyl group and $R_w$ for a member selected from the group consisting of hydrogen and methyl group.

6. A compound according to claim 5, said compound having the formula

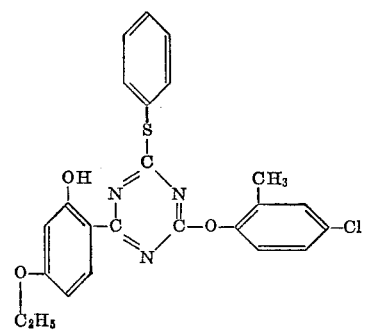

7. A compound according to claim 4, said compound having the formula

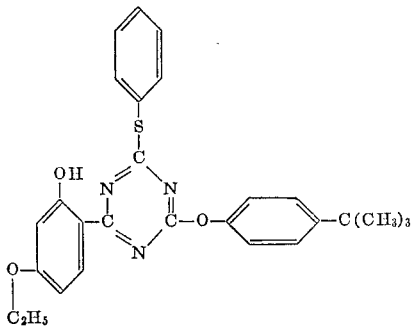

8. A compound according to claim 5, said compound having the formula

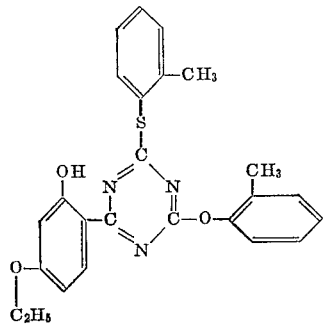

9. A compound according to claim 4, said compound having the formula

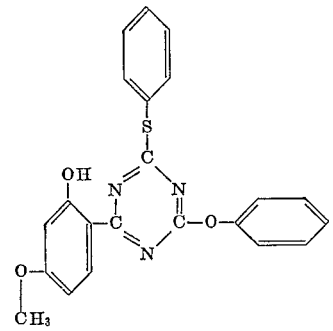

10. A compound according to claim 5, said compound having the formula

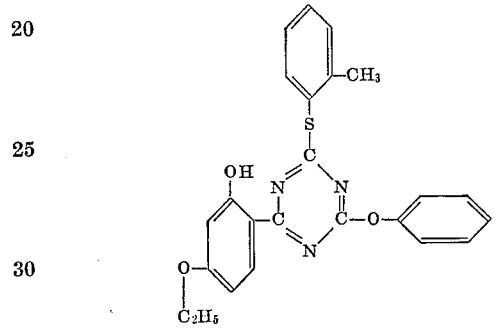

References Cited

UNITED STATES PATENTS

| | | |
|---|---|---|
| 3,170,895 | 2/1965 | Reimschuessel et al. __ 260—248 |
| 3,244,709 | 4/1966 | D'Alelio _____ 260—248 |
| 3,255,191 | 6/1966 | Dexter et al. _____ 260—248 |
| 3,270,016 | 8/1966 | Duennenberger et al. __ 260—248 |

HENRY R. JILES, *Primary Examiner.*

J. M. FORD, *Assistant Examiner.*

U.S. Cl. X.R.

260—249.5, 814, 45.8; 167—90, 91, 92; 252—401, 300; 106—176